(12) United States Patent
Wentink (10) Patent No.: US 8,279,740 B2
(45) Date of Patent: Oct. 2, 2012

(54) DYNAMIC TRANSMISSION PROTECTION IN THE PRESENCE OF MULTIPLE MODULATION SCHEMES

(75) Inventor: Maarten Menzo Wentink, Utrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 1735 days.

(21) Appl. No.: 10/688,527

(22) Filed: Oct. 17, 2003

(65) Prior Publication Data

US 2004/0136339 A1    Jul. 15, 2004

Related U.S. Application Data

(60) Provisional application No. 60/439,697, filed on Jan. 13, 2003.

(51) Int. Cl.
    *H04L 5/04* (2006.01)
(52) U.S. Cl. ........................ 370/204; 370/445
(58) Field of Classification Search .................. 370/229, 370/235, 250, 252, 278, 310, 329, 345, 445, 370/449, 461, 462, 465, 203, 204, 248, 338, 370/341, 347, 349; 455/456.4, 456.6, 102, 455/106, 205, 511, 522, 524; 375/297, 302, 375/320
See application file for complete search history.

(56) References Cited

U.S. PATENT DOCUMENTS

| | | | |
|---|---|---|---|
| 5,392,300 A * | 2/1995 | Borth et al. | 714/758 |
| 5,912,644 A * | 6/1999 | Wang | 342/457 |
| 6,473,419 B1 * | 10/2002 | Gray et al. | 370/349 |
| 6,996,415 B2 * | 2/2006 | Lee et al. | 455/522 |
| 7,046,649 B2 * | 5/2006 | Awater et al. | 370/338 |
| 2002/0027500 A1 * | 3/2002 | Reisinger | 340/426 |
| 2003/0128684 A1 * | 7/2003 | Hirsch et al. | 370/338 |
| 2004/0131019 A1 * | 7/2004 | Kandala | 370/311 |
| 2004/0136339 A1 * | 7/2004 | Wentink | 370/329 |
| 2006/0002357 A1 * | 1/2006 | Sherman | 370/338 |
| 2009/0310619 A1 * | 12/2009 | Brommer | 370/449 |

* cited by examiner

*Primary Examiner* — Nittaya Juntima
*Assistant Examiner* — Leon Andrews (57) ABSTRACT

A technique is disclosed for re-enabling transmission protection at enhanced stations while in the presence of high, enhanced modulation traffic conditions once protection has been disabled. Transmission protection allows enhanced modulation stations to co-exist with legacy modulation stations on a shared-communications channel. The problem being solved is when transmission protection is set to inactive and the Orthogonal Frequency Division Multiplexing (i.e., enhanced modulation) traffic load is high, legacy traffic is likely to collide repeatedly with Orthogonal Frequency Division Multiplexing transmissions, with the result that the access point does not notice that a legacy station has become active again. Consequently, the access point does not activate transmission protection. The present invention addresses the problem by defining access point mechanisms that are capable of re-enabling transmission protection, once protection has been disabled, in the presence of high, enhanced modulation traffic conditions.

38 Claims, 9 Drawing Sheets

DYNAMIC TRANSMISSION PROTECTION IN THE PRESENCE OF MULTIPLE MODULATION SCHEMES

CROSS-REFERENCE TO RELATED APPLICATIONS

This application claims the benefit of U.S. provisional application Serial No. 60/439,697, filed Jan. 13, 2003, entitled "Dynamic OFDM Protection Methods for Access Points," which is incorporated by reference.

FIELD OF THE INVENTION

The present invention relates to telecommunications in general, and, more particularly, to wireless local area networks.

BACKGROUND OF THE INVENTION

Figure 1:
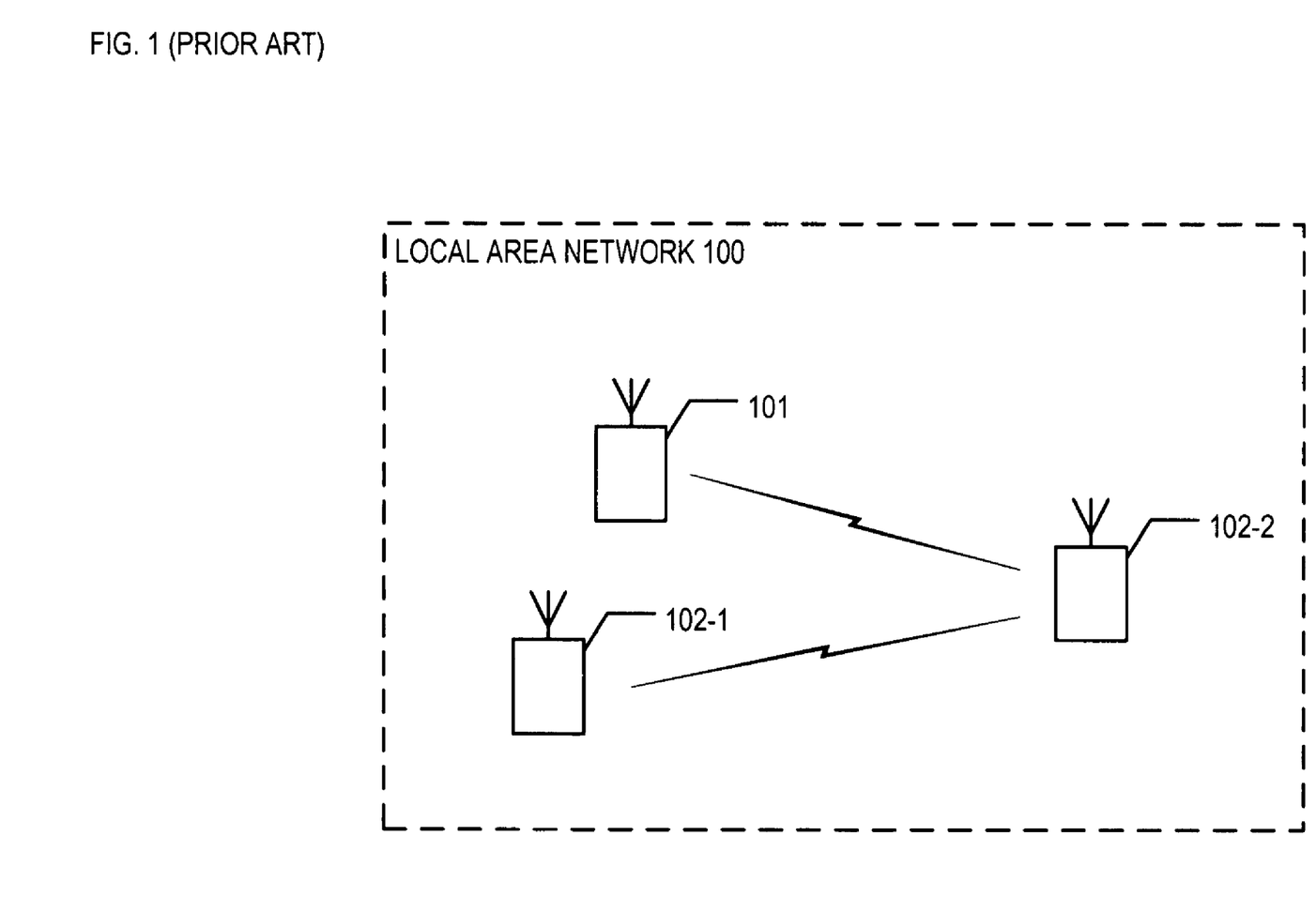
FIG. 1 depicts a schematic diagram of a portion of wireless local area network 100 in the prior art.

FIG. 1 depicts a schematic diagram of a portion of wireless local area network 100 in the prior art. Local area network 100 comprises stations 101, 102-1, and 102-2. Stations 101, 102-1, and 102-2 use a shared-communications channel to communicate among themselves and only one of the terminals can transmit into the channel at a time. When two terminals transmit into the channel at the same time, the result is a cacophony and both transmissions are garbled.

Therefore, a technique called Carrier Sense Multiple Access is used by the stations to coordinate when each of them transmits. In accordance with this technique, each radio listens to the shared-communications channel and waits to transmit until the channel is quiet (i.e., no other stations are transmitting). Carrier Sense Multiple Access is similar to the way in which each person in a group of polite people waits to speak until the person speaking is finished.

Station 101 can transmit and receive using:
  i. a first modulation scheme.
In contrast, stations 202-1 and 202-2 can transmit and receive using:
  i. the first modulation scheme, and
  ii. a second modulation scheme.
Because stations 102-1 and 102-2 can use a superset of the modulations schemes available to station 101, they are called "enhanced" stations. In contrast, station 101 is called a "legacy" station.

The modulation schemes available to a legacy station are called "legacy modulation schemes" and the modulation schemes available to an enhanced station are called "enhanced modulation schemes."

Any two stations that need to communicate must do so in accordance with a modulation scheme that is available to both of them. Therefore, two enhanced stations can communicate with any of the enhanced modulation schemes, but any communication involving a legacy station must use a legacy modulation scheme.

Stations 102-1 and 102-2 communicate with each other using the second modulation scheme when possible because it enhances communication throughput in comparison to the first modulation scheme. One effect of using the second scheme, however, is that station 101 cannot detect when stations 102-1 and 102-2 are communicating (i.e., stations 102-1 and 102-2 are essentially invisible to station 101 when stations 102-1 and 102-2 are communicating using the second modulation scheme). This can cause station 101 to transmit when stations 102-1 and 102-2 are communicating, which causes all of the transmissions to be garbled.

To address this problem, a method called "transmission protection" is known in the prior art to prevent legacy stations from transmitting while transmissions using the second modulation scheme are in progress.

In accordance with transmission protection, an enhanced station that is about to transmit a frame using the second modulation scheme first transmits a short frame using the first modulation scheme. This short frame is detectable by the legacy stations in the area.

A duration field in the short frame contains a value that indicates how long the legacy terminals should refrain from transmitting, and the field is populated with a duration that is long enough to cover the length of time for transmissions of frames using the second modulation scheme. The duration information inside the Request-to-Send or Clear-to-Send frame activates a virtual carrier sense mechanism in the legacy stations, which will not transmit, as a result, during the protected, subsequent second transmission.

A mechanism is also known in the prior art for notifying all of the enhanced stations in the network when to use and when not to use transmission protection. In accordance with this mechanism, one enhanced station has the capability to activate and deactivate transmission protection in the other enhanced stations by signaling whether or not protection must be used.

If transmission protection is disabled and there is a heavy traffic load using the second modulation scheme, transmissions from legacy stations will repeatedly collide with transmissions using the second modulation scheme and there might be an unreasonable delay before an enhanced station notices that a legacy station is trying to transmit. As a result, there might be a delay in activating transmission protection in the enhanced terminals.

Therefore, the need exists for a technique for reasonably activating transmission protection in enhanced terminals.

SUMMARY OF THE INVENTION

The present invention addresses this problem by defining access point mechanisms that are capable of re-enabling transmission protection, once protection has been disabled, in the presence of heavy, enhanced modulation (e.g., Orthogonal Frequency Division Multiplexing, etc.) traffic.

In accordance with the first illustrative embodiment of the present invention, when a legacy communication station is in a power save state, the access point periodically transmits a Null frame to that station. When the station "awakens" (i.e., has exited the power save state) and responds with an Acknowledgement frame, the access point re-enables transmission protection.

In accordance with the second illustrative embodiment of the present invention, when a legacy station becomes active and sends a message to the access point, the access point immediately activates transmission protection by sending a Probe-Response frame, comprising a protection status field that is set to active, to the enhanced stations. This is a different use of the Probe-Response frame than in the prior art because the frame is broadcast proactively, as opposed to being unicast in response to a previously-sent Probe-Request frame.

In accordance with the third illustrative embodiment of the present invention, the access point intermittently switches between enabling transmission protection and disabling transmission protection at enhanced stations. The intervals during which protection is activated facilitate the transmission of any pending legacy modulation frame.

In accordance with the fourth illustrative embodiment of the present invention, the access point repeatedly transmits an enhanced modulation frame that inhibits transmissions by enhanced stations for a portion of the time period between repeated enhanced modulation frame transmissions. This gives legacy stations the opportunity to transmit as needed because they do not detect the enhanced inhibiting frame.

The illustrative embodiment comprises: determining a power save status of a first station wherein said first station communicates via a shared-communications channel in accordance with a first modulation scheme; and enabling transmission protection at a second station via said shared-communications channel wherein said enabling is dependent on said power save status.

DETAILED DESCRIPTION

Figure 2:
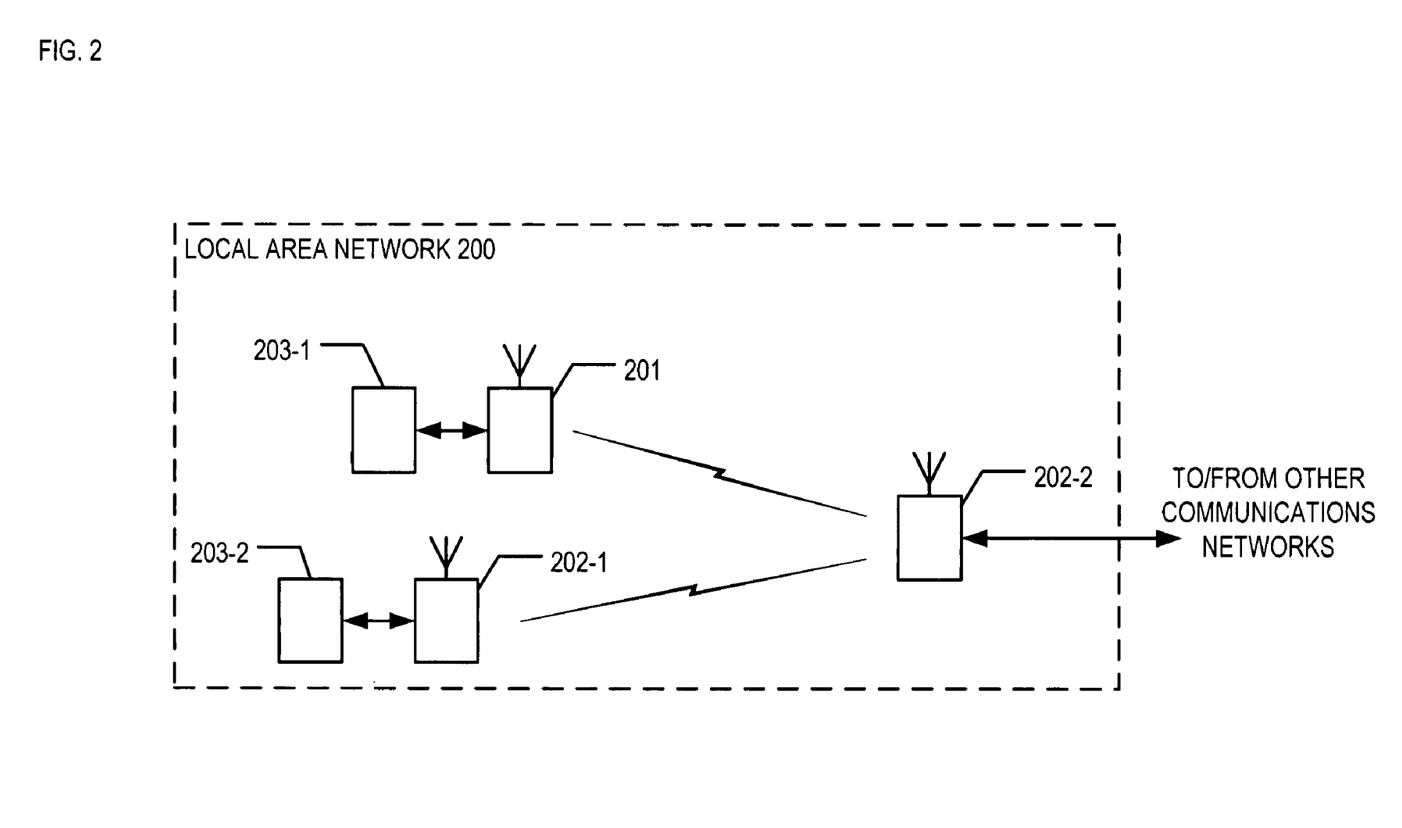
FIG. 2 depicts a schematic diagram of a portion of local area network 200 in accordance with the illustrative embodiment of the present invention.

FIG. 2 depicts a schematic diagram of wireless local area network 200 in accordance with the illustrative embodiment of the present invention. Local area network 200 operates in accordance with the IEEE 802.11 set of protocols and comprises communication stations 201, 202-1, and 202-2, and hosts 203-1 and 203-2, interconnected as shown.

Station 201 transmits and receives using:
  i. Complementary Code Keying, and
  ii. Barker modulation.
In contrast, stations 202-1 and 202-2 transmit and receive using:
  i. Complementary Code Keying,
  ii. Barker modulation, and
  iii. Orthogonal Frequency Division Multiplexing.
Because stations 202-1 and 202-2 can use a superset of the modulations schemes available to station 201, they are called "enhanced" stations whereas station 201 is called a "legacy" station.

The modulation schemes available to a legacy station are called "legacy modulation schemes" and the modulation schemes available to an enhanced station are called "enhanced modulation schemes." Any two stations that need to communicate must do so in accordance with a modulation scheme that is available to both of them. Therefore, two enhanced stations can communicate with any of the enhanced modulation schemes, but any communication involving a legacy station must use a legacy modulation scheme.

For the purposes of this specification, a frame that is transmitted using a legacy modulation scheme is referred to as "legacy modulation frame," and a frame that is transmitted using an enhanced modulation scheme is referred to as "enhanced modulation frame."

It will be clear to those skilled in the art, after reading this specification, how to make and use embodiments of the present invention that operate in accordance with other protocols and modulation schemes. Furthermore, it will be clear to those skilled in the art, after reading this specification, how to make and use embodiments of the present invention that use a wireline or tangible shared-communications channel. And still furthermore, it will be clear to those skilled in the art, after reading this specification, how to make and use embodiments of the present invention with any number of legacy stations and any number of enhanced stations.

Enhanced station 202-2 is an access point and, as such, enables stations 201 and 201-1 within local area network 200 to communicate with devices in other communications networks. Because station 202-2 is an access point, stations 201 and 202-1 communicate with each other through enhanced station 202-2, because enhanced station 202-2 coordinates the communications on local area network 200. The salient details of enhanced station 202-2 are described below and with respect to FIG. 3.

Legacy station 201 comprises the radio that enables host 203-1 to communicate via the shared-communications channel. Legacy station 201 is capable of receiving a data block from host 203-1 and transmitting over the shared-communications channel one or more data frame comprising the payload portion of the data block. Legacy station 201 is also capable of receiving one or more data frames from the shared communications channel and sending to host 203-1 a data block comprising payload portion of the data frames. It will be clear to those skilled in the art how to make and use legacy station 201 and host 203-1.

Enhanced station 202-1 and host 203-2 have a relationship similar to that described for legacy station 201 and host 203-1. It will be clear to those skilled in the art how to make and use stations 202-1, and hosts 203-1 and 203-2.

Figure 3:
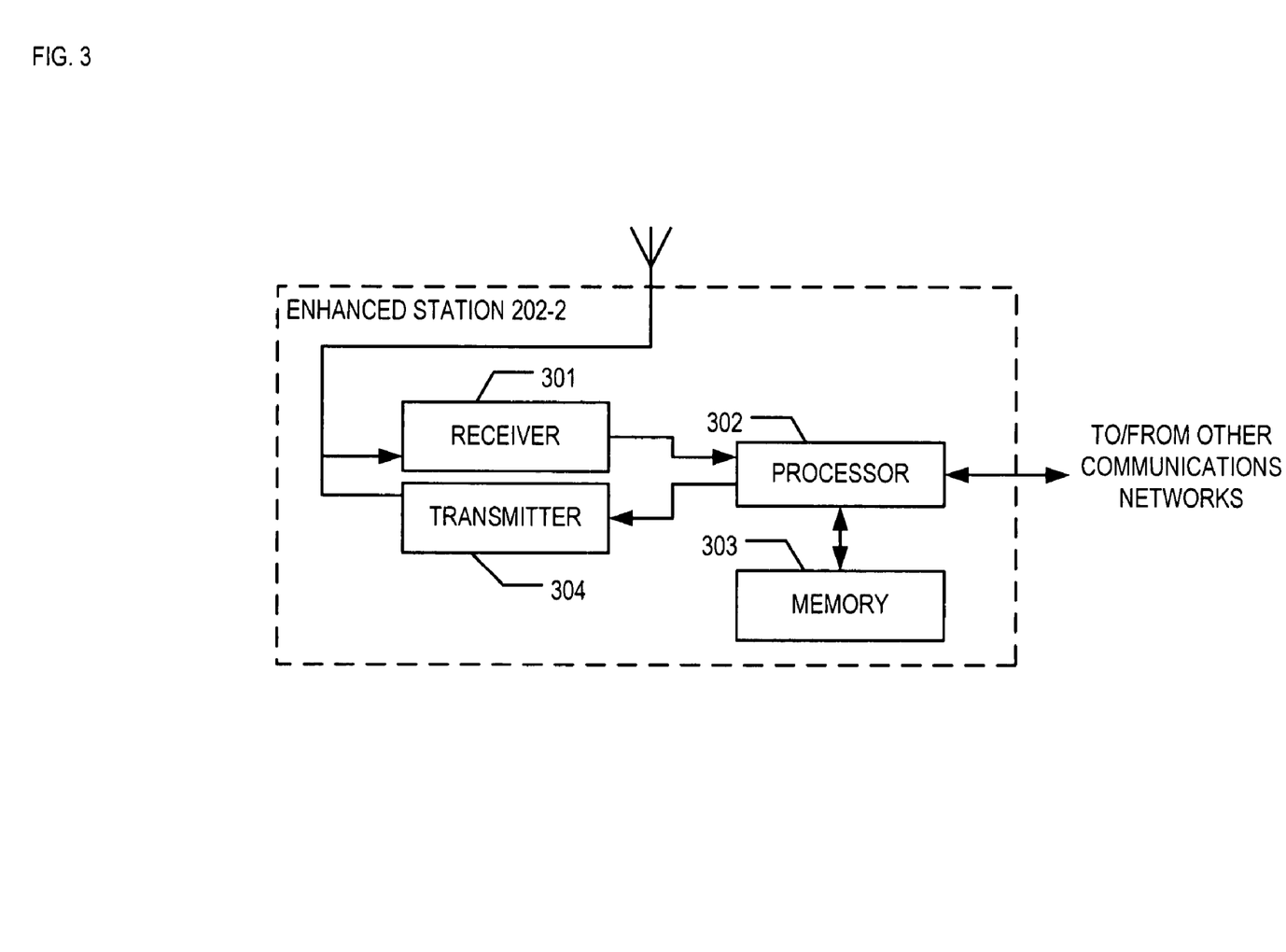
FIG. 3 depicts a block diagram of the salient components of enhanced station 202-2 in accordance with the illustrative embodiment of the present invention.

FIG. 3 depicts a block diagram of the salient components of enhanced station 202-2, the access point, in accordance with the illustrative embodiment of the present invention. Enhanced station 202-2 comprises: receiver 301, processor 302, memory 303, and transmitter 304, interconnected as shown.

Receiver 301 is a circuit that is capable of receiving frames from another station via the shared-communications channel, in well-known fashion, and of forwarding them to processor 302. It will be clear to those skilled in the art, after reading this specification, how to make and use receiver 301.

Processor 302 is a general-purpose processor that is capable of performing the tasks described below and with respect to FIGS. 4 through 9. It will be clear to those skilled in the art, after reading this specification, how to make and use processor 302.

Memory 303 is capable of storing programs and data used by processor 302. It will be clear to those skilled in the art how to make and use memory 303.

Transmitter 304 is a circuit that is capable of receiving frames from processor 302, in well-known fashion, and of transmitting them to another station via the shared-communications channel in accordance with an enhanced modulation scheme. It will be clear to those skilled in the art, after reading this specification, how to make and use transmitter 304.

Figure 4:
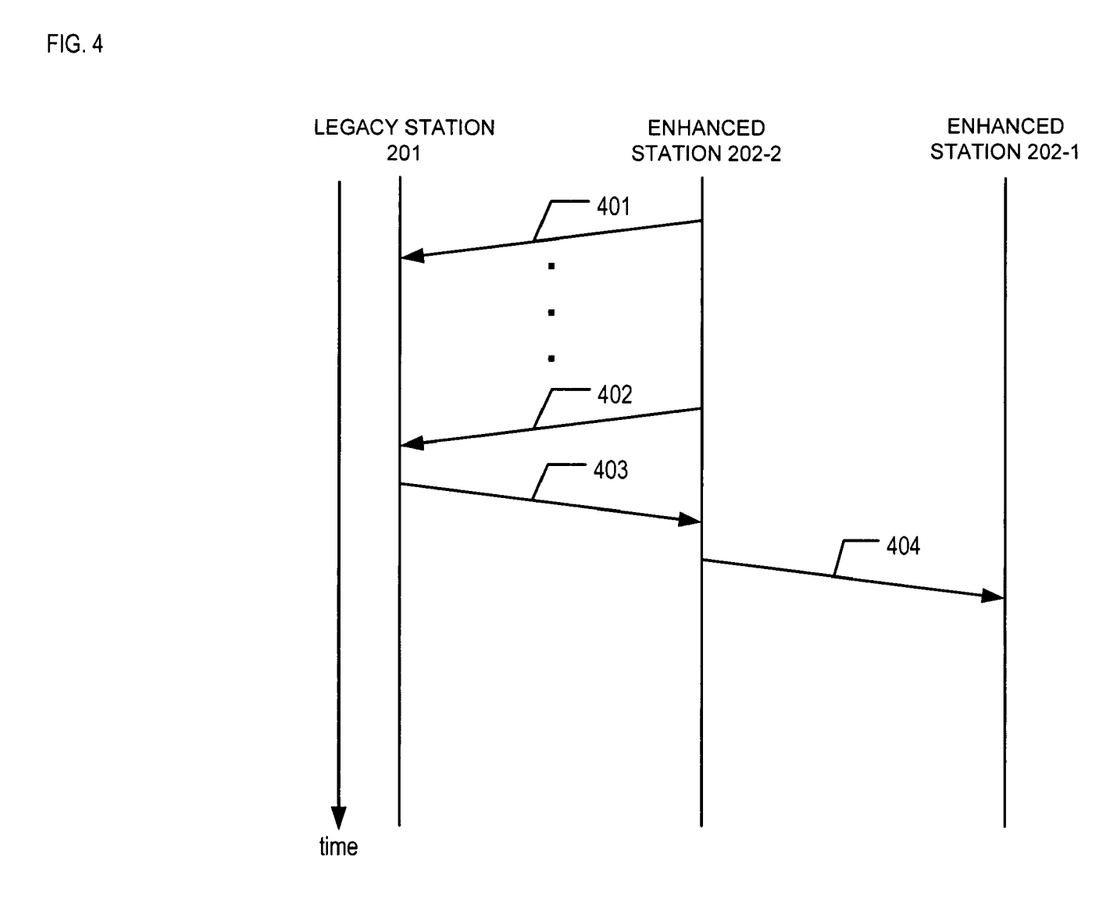
FIG. 4 depicts a message flow diagram in accordance with the first illustrative embodiment of the present invention.

FIG. 4 depicts a message flow diagram in accordance with the first illustrative embodiment of the present invention. When the message flow diagram in FIG. 4 begins, transmission protection is disabled for the enhanced station in local area network 200.

Enhanced station 202-2 (i.e., the access point) tracks the power save status of the legacy stations (e.g., legacy station 201, etc.) present in local area network 200. The power save state is defined as a state in which the transmitter (or both the transmitter and receiver) of a station is powered down, and the power save status is an indication of whether or not a legacy station is in the power save state.

With message 401, enhanced station 202-2 transmits to legacy station 201 a Null frame to determine the power save status of legacy station 201. A Null frame, as defined in the IEEE 802.11 protocols, is a frame with an empty payload, which is answered with an Acknowledgement frame by the receiving station and then discarded. In some alternative embodiments of the present invention, message 401 can be a Request-to-Send frame or a data frame instead. When legacy station 201 is in the power save state, then enhanced station 202-2 does not receive a response, as is the case for message 401. Enhanced station 202-2 then attempts to determine the power save status of other legacy stations in the network that it coordinates.

With message 402, enhanced station 202-2 transmits to legacy station 201 another Null frame as part of continually tracking the power save status of legacy stations,. When legacy station 201 is not in the power save state, legacy terminal 201 responds with message 403, which is an acknowledgement that legacy terminal 201 has received message 402. Message 403 is an Acknowledgement frame or a Clear-to-Send frame depending, as will be clear to those skilled in the art, on whether message 402 is a Null frame, a Request-to-Send frame, or a data frame.

When station 202-2 receives message 403 enhanced station 202-2 immediately activates transmission protection for itself and broadcasts message 404 to activate transmission protection in the other enhanced stations in the network. Message 404 is a management frame, which can be for example, a Beacon frame or a Probe-Response frame with protection status set to active. The protection status can be represented by the Use_Protection bit for IEEE 802.11 protocols, for example. It will be clear to those skilled in the art how to broadcast a management frame to stations in local area network 200.

In some alternative embodiments of the present invention, station 202-2 broadcasts the management frame using a legacy modulation scheme. In yet some other alternative embodiments of the present invention, station 202-2 first transmits a control frame (e.g., Request_to_Send, Clear_to_Send, etc.) using a legacy modulation scheme, specifying a duration that covers a management frame that station 202-2 subsequently broadcasts using either an enhanced or legacy modulation scheme.

Figure 5:
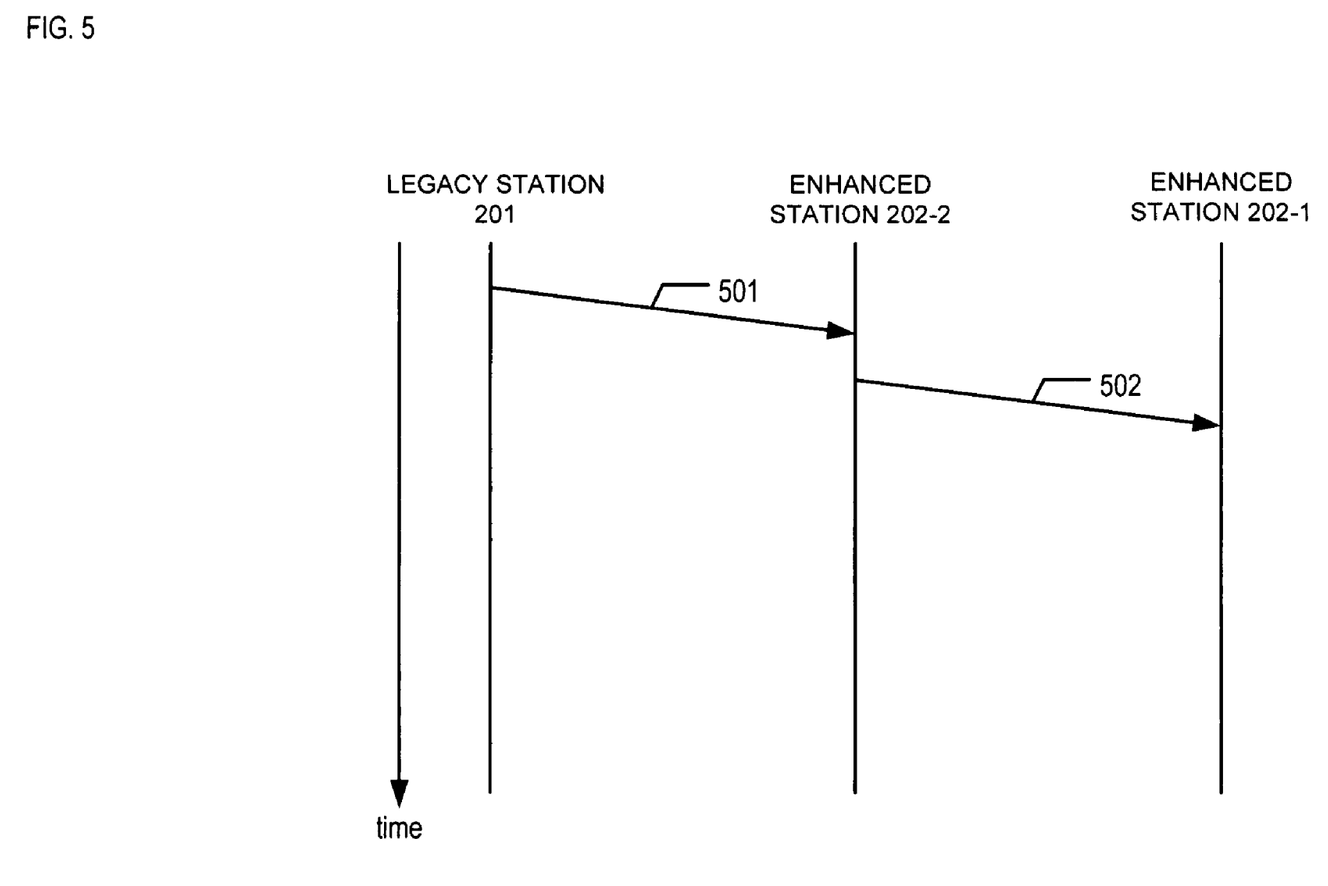
FIG. 5 depicts a message flow diagram in accordance with the second illustrative embodiment of the present invention.

FIG. 5 depicts a message flow diagram in accordance with the second illustrative embodiment of the present invention. When the message flow diagram in FIG. 5 begins, transmission protection is disabled for the enhanced station in local area network 200.

FIG. 5 represents a scenario in which enhanced station 202-2 (i.e., the access point) detects a legacy station transmission, but cannot wait until the next beacon frame transmission to update the enhanced stations' transmission protection.

With message 501, legacy station 201 transmits a frame to enhanced station 202-2 when transmission protection is inactive, which message is indicative that a legacy station has become active.

As a result of the receipt of message 501, enhanced station 202-2 immediately activates transmission protection for its own transmissions. Enhanced station 202-2 then with message 502 enables transmission protection for all enhanced stations in the network.

With message 502 enhanced station 202-2 broadcasts a Probe-Response frame to all stations, including enhanced station 202-1 with the protection status set to active. The protection status can be represented by the Use_Protection bit for IEEE 802.11 protocols, for example. The second illustrative embodiment of the present invention uses the Probe-Response frame proactively and with a broadcast address, as opposed to using the Probe-Response as a unicast response, as is known in the art, to an IEEE 802.11 Probe Request message.

In some alternative embodiments of the present invention, station 202-2 broadcasts the Probe-Response frame using a legacy modulation scheme. In yet some other alternative embodiments of the present invention, station 202-2 first transmits a control frame (e.g., Request_to_Send, Clear_to_Send, etc.) using a legacy modulation scheme, that specifies a duration that covers a Probe-Response frame that station 202-2 subsequently broadcasts using either an enhanced or legacy modulation scheme.

Figure 6:
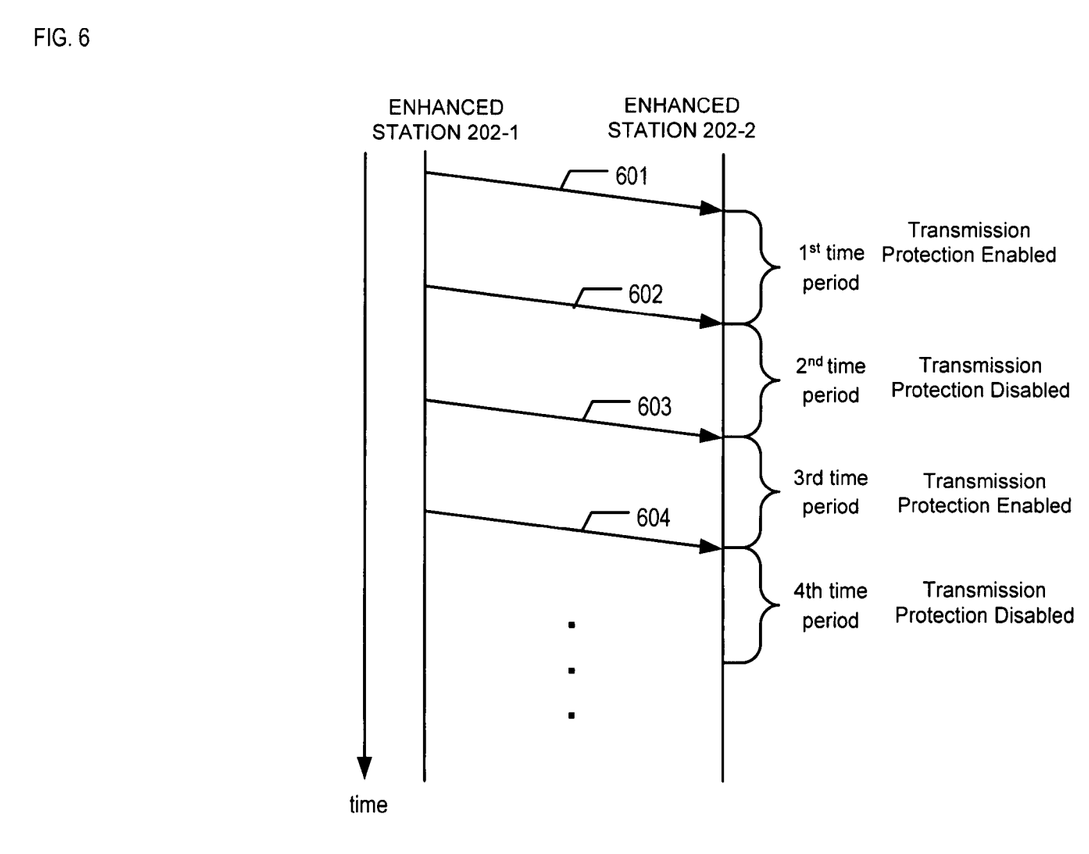
FIG. 6 depicts a message flow diagram in accordance with the third illustrative embodiment of the present invention.

FIG. 6 depicts a message flow diagram in accordance with the third illustrative embodiment of the present invention. When the message flow diagram in FIG. 6 begins, transmission protection is disabled for the enhanced station in local area network 200.

In accordance with the third illustrative embodiment, enhanced station 202-2 (i.e., the access point) alternately switches between enabling transmission protection and disabling transmission protection for both its own transmissions and for all of the enhanced stations in local area network. The intervals during which protection is activated facilitate the transmission of any pending frames from legacy station 201.

With message 601, enhanced station 202-2 broadcasts a management frame indicating active protection status. The management frame can be a Beacon frame or a Probe-Response frame with the protection status field set to active, which directs the enhanced stations in local area network 200 to enable transmission protection during a first time period.

In some alternative embodiments of the present invention, station 202-2 broadcasts the management frame using a legacy modulation scheme. In yet some other embodiments of the present invention, station 202-2 first transmits a control frame (e.g., Request_to_Send, Clear_to_Send, etc.) using a legacy modulation scheme that specifies a duration that covers a management frame that station 202-2 subsequently broadcasts using either an enhanced or legacy modulation scheme.

With message 602, enhanced station 202-2 broadcasts a management frame indicating inactive protection status. The management frame can be a Beacon frame or a Probe-Response frame with the protection status field set to inactive, which directs the enhanced stations in local area network 200 to disable transmission protection during a second time period.

Messages 603 and 604 are the same as messages 601 and 602, respectively. Enhanced station 202-2 alternately enables and disables transmission protection for enhanced station 202-1 and other enhanced stations with respect to time. In some embodiments, this enabling and disabling is periodic with respect to time, so that the length of the third time period depicted in FIG. 6 is the same length as the first time period, and the length of the fourth time period is the same length as the second time period, and so on. In some other embodiments of the present invention, alternately enabling and disabling transmission protection can be sporadic with respect to time.

In still other embodiments, the enabling and disabling of transmission protection can be performed with respect to management frames transmitted. For example, enhanced station 202-2 can alternately enable transmission protection in two successive management frames and disable transmission protection in a third management frame. It will be clear to those skilled in the art, after reading this specification, that any number of frames in which transmission protection is enabled can be followed by any number of frames in which transmission protection is disabled. This pattern can be periodic or sporadic with respect to frames transmitted by enhanced station 202-2.

Figure 7:
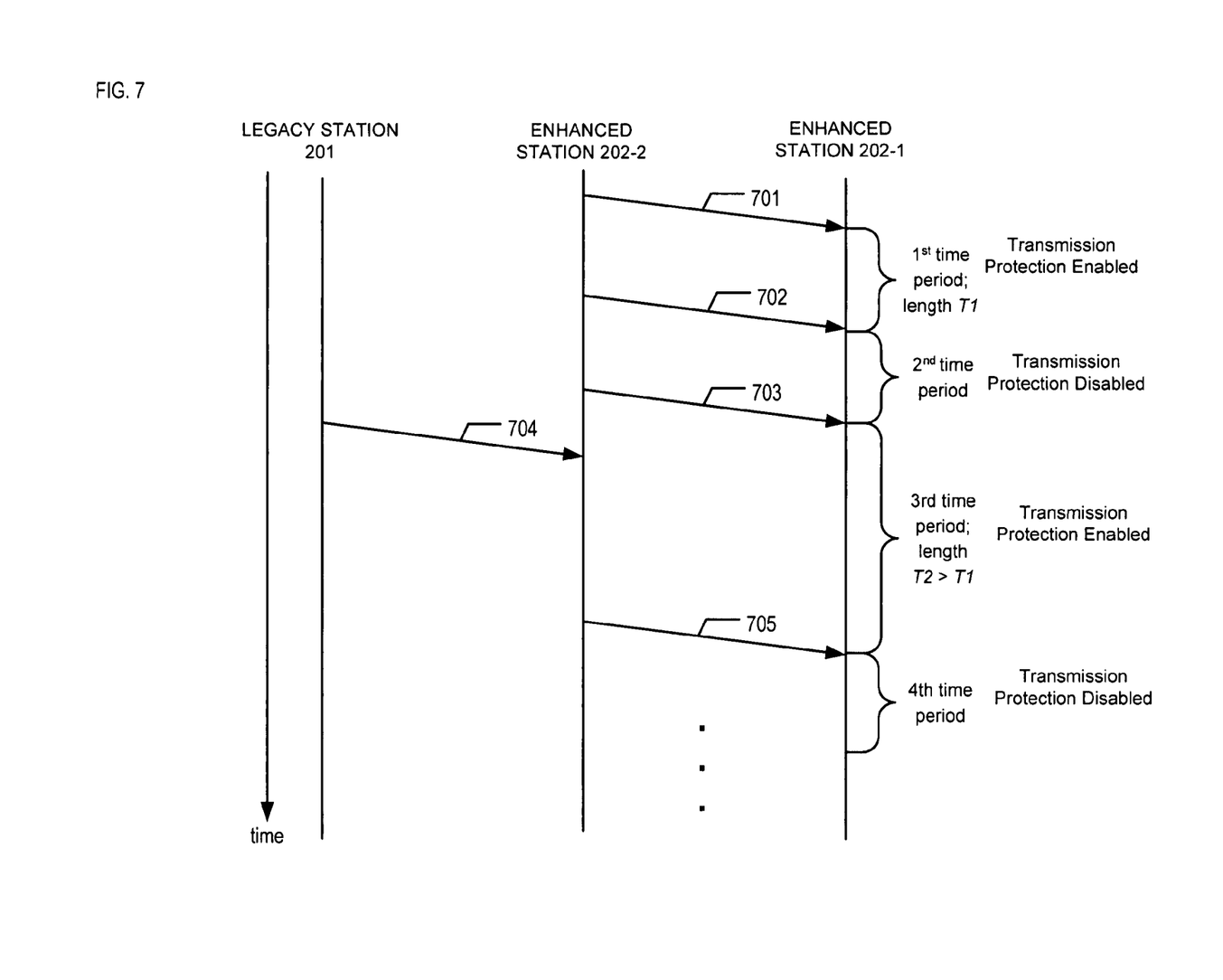
FIG. 7 depicts a message flow diagram in accordance with the third illustrative embodiment of the present invention wherein enhanced station 202-2 receives a legacy modulation frame from legacy station 201 during a protected period.

FIG. 7 depicts a message flow diagram in accordance with the third illustrative embodiment of the present invention wherein enhanced station 202-2 receives a legacy modulation frame from legacy station 201 during a protected period. When the message flow diagram in FIG. 7 begins, transmission protection is disabled for the enhanced station in local area network 200.

In accordance with the third illustrative embodiment, enhanced station 202-2 (i.e., the access point) alternately switches between enabling transmission protection and disabling transmission protection for both its own transmissions and for enhanced station 202-1's transmissions. The intervals during which protection is activated facilitate the transmission of any pending frames from legacy station 201.

With message 701, enhanced station 202-2 broadcasts a management frame indicating active protection status. The management frame can be a Beacon frame or a Probe-Response frame with the protection status field set to active, thereby directing enhanced station 202-1, as well as other enhanced stations, to enable transmission protection for its own transmissions during the first time period of length $T_1$.

With message 702, enhanced station 202-2 broadcasts a management frame indicating inactive protection status. The management frame can be a Beacon frame or a Probe-Response frame with the protection status field set to inactive, thereby directing enhanced station 202-1, as well as other enhanced stations, to disable transmission protection for its own transmissions during the second time period.

With message 703, enhanced station 202-2 broadcasts a management frame indicating active protection status for the third time period.

With message 704, enhanced station 202-2 receives a legacy modulation frame from legacy station 201. In accordance with the illustrative embodiment of the present invention, enhanced station 202-2 extends the protected period to length $T_2$ as a result of having detected the legacy modulation frame, message 704. Length $T_2$, for example, can be greater than length $T_1$, the length of the protected period that follows message 701.

With message 705, enhanced station 202-2 resumes alternately enabling and disabling protection by broadcasting a management frame indicating inactive protection status for the fourth time period.

Figure 8:
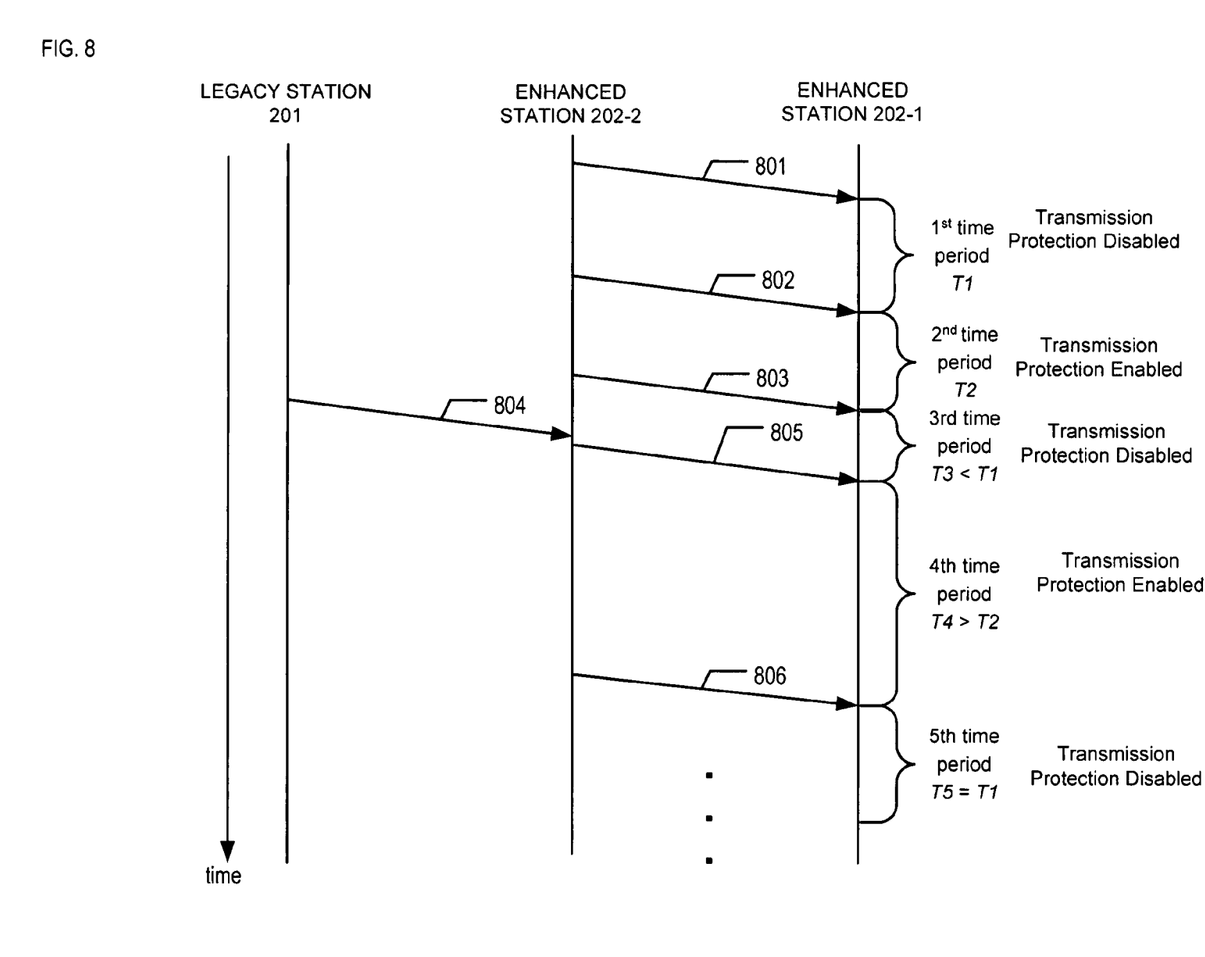
FIG. 8 depicts a message flow diagram in accordance with the third illustrative embodiment of the present invention wherein enhanced station 202-2 receives a legacy modulation frame from legacy station 201 during an unprotected period.

FIG. 8 depicts a message flow diagram in accordance with the third illustrative embodiment of the present invention wherein enhanced station 202-2 receives a legacy modulation frame from legacy station 201 during an unprotected period. Transmission protection is initially enabled for enhanced station 202-1 and other enhanced stations.

In accordance with the third illustrative embodiment, enhanced station 202-2 (i.e., the access point) alternately switches between disabling transmission protection and enabling transmission protection for both its own transmissions and for enhanced station 202-1's transmissions. The intervals during which protection is activated facilitate the transmission of any pending frames from legacy station 201.

With message 801, enhanced station 202-2 broadcasts a management frame indicating inactive protection status. The management frame can be a Beacon frame or a Probe-Response frame with the protection status field set to inactive, thereby directing enhanced station 202-1, as well as other enhanced stations, to disable transmission protection for its own transmissions during the first time period of length $T_1$.

With message 802, enhanced station 202-2 broadcasts a management frame indicating active protection status. The management frame can be a Beacon frame or a Probe-Response frame with the protection status field set to active, thereby directing enhanced station 202-1, as well as other enhanced stations, to enable transmission protection for its own transmissions during the second time period of length $T_2$.

With message 803, enhanced station 202-2 broadcasts a management frame indicating inactive protection status for the third time period.

With message 804, enhanced station 202-2 receives a legacy modulation frame from legacy station 201. In accordance with the illustrative embodiment of the present invention, enhanced station 202-2 reduces the length $T_3$ of the unprotected third time period as a result of having detected the legacy modulation frame of message 804. Length $T_3$, for example, can be made shorter than length $T_1$, the length of the protected period that follows message 801.

With message 805, enhanced station 202-2 effectively ends the unprotected period by broadcasting a management frame indicating active protection status. The length $T_4$ of the protected fourth period is made greater than the length of $T_2$, the length of the previous protected period (i.e., the second time period).

With message 806, enhanced station 202-2 resumes alternately enabling and disabling protection for set lengths (e.g., $T_5$ is made equal to $T_1$, etc.) by broadcasting a management frame indicating inactive protection status for the fifth time period.

Figure 9:
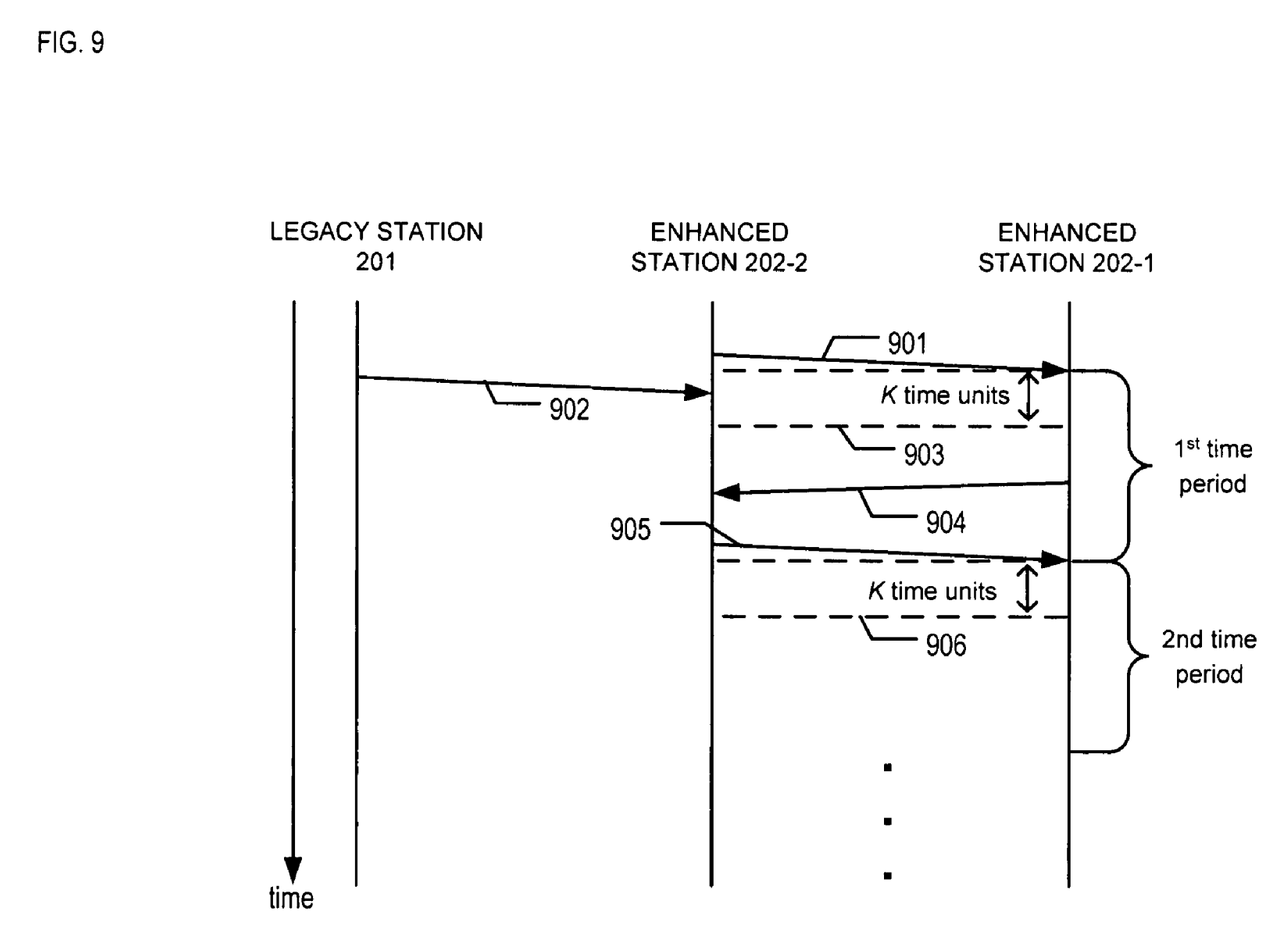
FIG. 9 depicts a message flow diagram in accordance with the fourth illustrative embodiment of the present invention.

FIG. 9 depicts a message flow diagram in accordance with the fourth illustrative embodiment of the present invention. Transmission protection is initially disabled for enhanced station 202-1 and other enhanced stations.

With message 901, enhanced station 202-2 (i.e., the access point) transmits a frame using the Orthogonal Frequency Division Multiplexing (i.e., enhanced) modulation scheme to enhanced station 202-1. This Orthogonal Frequency Division Multiplexing frame comprises a duration field with a value that is used by all stations that receive the frame to set their network allocation vectors (NAV) and refrain from transmitting, in well-known fashion. During the time interval corresponding to the duration field value (depicted as being K time units in length), enhanced stations, including enhanced station 202-1, refrain from transmitting any frames and are muted.

Meanwhile, legacy station 201 is unable to detect this frame, because legacy station 201, as well as other legacy stations, is unable to detect Orthogonal Frequency Division Multiplexing modulations, and as a result will not set its network allocation vector. Legacy station 201, therefore, has an opportunity to transmit while the enhanced stations are muted.

With message 902, legacy station 201 transmits a frame to enhanced station 202-2 using a legacy modulation scheme (e.g., Barker, Complementary Code Keying, etc.).

At time 903, the time interval ends for enhanced stations to be muted.

With message 904, enhanced station 202-1 is allowed to transmit a frame to enhanced station 202-2.

With message 905, the muting cycle begins again, starting with enhanced station 202-2 transmitting a frame using the Orthogonal Frequency Division Multiplexing modulation scheme to enhanced station 202-1. This Orthogonal Frequency Division Multiplexing frame comprises a duration field with a value that is used by all stations that receive the frame to set their network allocation vectors (NAV) and refrain from transmitting, in well-known fashion. During the time interval corresponding to the duration field value (depicted as being K time units in length), enhanced station 202-1, noting the duration field value, refrains from transmitting any frames.

At time 906, the time interval ends for enhanced stations to be muted.

The illustrative embodiment of the present invention takes advantage of the fact that when enhanced station 202-2 transmits a frame comprising a duration value using an enhanced modulation scheme, the legacy stations (e.g., legacy station 201, etc.) are unable to detect the frame and, as a result, continue to access the shared-communications channel as needed. This is in contrast to earlier techniques disclosed outside of this specification in which a station transmits a frame comprising a duration value to mute both enhanced and legacy stations.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   determining, at an access point, a power save status of a first device configured to communicate in accordance with a first modulation scheme, wherein the first device is a legacy station, and wherein determining the power save status comprises:
      transmitting a Null frame from the access point to the first device and awaiting a response to the Null frame from the first device; and
      receiving one of an Acknowledgement frame and a Clear-to-Send frame from the first device in response to the Null frame; and
   responsive to a determination that the first device is not in a power save state,
      (i) enabling transmission protection at the access point for the first device; and
      (ii) transmitting, from the access point, a message requesting that a second device enable transmission protection for a portion of time to enable the first device to transmit, wherein the second device is an enhanced station, and wherein the second device and the access point are configured to communicate in accordance with the first modulation scheme and a second modulation scheme.

2. The method of claim 1, wherein transmitting the message requesting that the second device enable transmission protection comprises broadcasting a management frame.

3. The method of claim 2, wherein the management frame is one of:
   (i) a Beacon frame indicating that protection status is active; and
   (ii) a Probe-Response frame indicating that protection status is active.

4. A method comprising:
   transmitting, from an access point, a first message requesting that a first device enable transmission protection and a second message requesting that the first device disable transmission protection, wherein the first device is an enhanced station, wherein the first message and the second message are continuously transmitted in an alternating pattern, and wherein a time period separates the transmission of the first message and the transmission of the second message; and
   in response to receiving a message from a second device at the access point, adjusting the time period separating the transmission of the first message and the second message,
   wherein the second device is a legacy station and is configured to communicate in accordance with a first modulation scheme, and the first device and access point are configured to communicate in accordance with the first modulation scheme and a second modulation scheme.

5. The method of claim 4, wherein, if the most recent message sent from the access point to the first device is the second message, adjusting the time period comprises reducing the amount of time until transmission of the first message.

6. The method of claim 4, wherein, if the most recent message sent from the access point to the first device is the first message, adjusting the time period comprises increasing the amount of time until transmission of the second message.

7. The method of claim 4, wherein the first message is a Beacon frame or a Probe-Response frame.

8. The method of claim 4, wherein the message received from the second device is a legacy modulation frame.

9. The method of claim 4,
   wherein the first modulation scheme is based at least in part on one of Barker modulation and Complementary Code Keying modulation; and
   wherein the second modulation scheme is based at least in part on Orthogonal Frequency Division Multiplexing modulation.

10. A method comprising:
    transmitting from an access point a first frame comprising a duration field with a value to a first device via a shared-communications channel in a wireless local area network in accordance with a first modulation scheme, wherein the first device is an enhanced station and is configured to communicate in accordance with the first modulation scheme and a second modulation scheme; and
    receiving at the access point a second frame from a second device via the shared-communications channel in accordance with the second modulation scheme during a time interval defined by the value, wherein the second device is a legacy station and is configured to communicate in accordance with the second modulation scheme,
       wherein the first frame is undetectable to the second device, and
       wherein the first modulation scheme and the second modulation scheme are different from each other.

11. The method of claim 10:
wherein the first modulation scheme is based at least in part on Orthogonal Frequency Division Multiplexing modulation; and
wherein the second modulation scheme is based at least in part on one of Barker modulation and Complementary Code Keying modulation.

12. The method of claim 10, wherein the transmitting is one of (i) periodic and (ii) sporadic.

13. The method of claim 10, wherein the first frame further comprises instructions to refrain from transmitting frames for a time interval.

14. An access point comprising:
a memory comprising a computer-readable program; and
a processor operably coupled to the memory and configured to execute the computer-readable program to cause the access point to
determine a power save status of a first device configured to communicate in accordance with a first modulation scheme, wherein the first device is a legacy station, and wherein determining the power save status comprises:
transmitting a Null frame from the access point to the first device and awaiting a response to the Null frame from the first device, and
receiving one of an Acknowledgement frame and a Clear-to-Send frame from the first device in response to the Null frame; and
in response to a determination that the first device is not in a power save state,
(i) enable transmission protection at the access point for the first device; and
(ii) transmit, from the access point, a message requesting that a second device enable transmission protection for a portion of time to enable the first device to transmit, wherein the second device is an enhanced station, and wherein the second device and the access point are configured to communicate in accordance with the first modulation scheme and a second modulation scheme.

15. The access point of claim 14, wherein the access point requests transmission protection at the third device by broadcasting a management frame via the shared-communications channel.

16. The access point of claim 15, wherein the management frame is one of:
(i) a Beacon frame indicating that protection status is active; and
(ii) a Probe-Response frame indicating that protection status is active.

17. An access point comprising:
a memory comprising a computer-readable program; and
a processor operable coupled to the memory and configured to execute the computer-readable program to cause the access point to
transmit a first message requesting that a first device enable transmission protection and a second message requesting that the first device disable transmission protection, wherein the first device is an enhanced station, wherein the first message and the second message are continuously transmitted in an alternating pattern, and wherein a time period separates the transmission of the first message and the transmission of the second message; and
in response to receiving a message from a second device, adjust the time period separating the transmission of the first message and the second message,
wherein the second device is a legacy station and is configured to communicate in accordance with a first modulation scheme, and the first device and access point are configured to communicate in accordance with the first modulation scheme and a second modulation scheme.

18. The access point of claim 17, wherein, if the most recent message sent to the first device is the second message, the access point adjusts the time period by reducing the amount of time until transmission of the first message.

19. The access point of claim 17, wherein, if the most recent message sent to the first device is the first message, the access point adjusts the time period by increasing the amount of time until transmission of the second message.

20. The access point of claim 17, wherein the first message is a Beacon frame or a Probe-Response frame.

21. The access point of claim 17, wherein the message received from the second device is a legacy modulation frame.

22. The access point of claim 17,
wherein the first modulation scheme is based at least in part on one of Barker modulation and Complementary Code Keying modulation; and
wherein the second modulation scheme is based at least in part on Orthogonal Frequency Division Multiplexing modulation.

23. An access point comprising:
a memory comprising a computer-readable program; and
a processor operably coupled to the memory and configured to execute the computer-readable program to cause the access point to
transmit a first frame comprising a duration field with a value to a first device via a shared-communications channel in a wireless local area network in accordance with a first modulation scheme, wherein the first device is an enhanced station and is configured to communicate in accordance with the first modulation scheme and a second modulation scheme; and
receive a second frame from a second device via the shared-communications channel in accordance with the second modulation scheme during a time interval defined by the value, wherein the second device is a legacy station and is configured to communicate in accordance with the second modulation scheme,
wherein the first frame is undetectable to the second device, and
wherein the first modulation scheme and the second modulation scheme are different from each other.

24. The access point of claim 23:
wherein the first modulation scheme is based at least in part on Orthogonal Frequency Division Multiplexing modulation; and
wherein the second modulation scheme is based at least in part on one of Barker modulation and Complementary Code Keying modulation.

25. The access point of claim 23, wherein the transmitting is one of (i) periodic and (ii) sporadic.

26. The access point of claim 23, wherein the first frame further comprises instructions to refrain from transmitting frames for a time interval.

27. An article of manufacture including a non-transitory computer-readable medium having instructions stored thereon that, if executed by an access point, cause the access point to perform operations comprising:
determining a power save status of a first device configured to communicate in accordance with a first modulation scheme, wherein the first device is a legacy station, and wherein determining the power save status comprises:

transmitting a Null frame from the access point to the first device and awaiting a response to the Null frame from the first device, and receiving one of an Acknowledgement frame and a Clear-to-Send frame from the first device in response to the Null frame; and in response to a determination that the first device is not in a power save state, (i) enabling transmission protection at the access point for the first device; and (ii) transmitting, from the access point, a message requesting that a second device enable transmission protection for a portion of time to enable the first device to transmit, wherein the second device is an enhanced station, and wherein the second device and access point are configured to communicate in accordance with the first modulation scheme and a second modulation scheme.

28. The article of manufacture of claim 27, wherein the access point requests transmission protection at the second device by broadcasting a management frame via the shared-communications channel.

29. The article of manufacture of claim 28, wherein the management frame is one of:

(i) a Beacon frame indicating that protection status is active; and (ii) a Probe-Response frame indicating that protection status is active.

30. An article of manufacture including a non-transitory computer-readable medium having instructions stored thereon that, if executed by an access point, cause the access point to perform operations comprising:

transmitting a first message requesting that a first device enable transmission protection and a second message requesting that the first device disable transmission protection, wherein the first device is an enhanced station, wherein the first message and the second message are continuously transmitted in an alternating pattern, and wherein a time period separates the transmission of the first message and the transmission of the second message; and in response to receiving a message from a second device, adjusting the time period separating the transmission of the first message and the second message, wherein the second device is a legacy station and is configured to communicate in accordance with a first modulation scheme, and the first device and access point are configured to communicate in accordance with the first modulation scheme and a second modulation scheme.

31. The article of manufacture of claim 30, wherein, if the most recent message sent to the first device is the second message, adjusting the time period includes reducing the amount of time until transmission of the first message.

32. The article of manufacture of claim 30, wherein, if the most recent message sent to the first device is the first message, adjusting the time period includes increasing the amount of time until transmission of the second message.

33. The article of manufacture of claim 30, wherein the first message is a Beacon frame or a Probe-Response frame.

34. The article of manufacture of claim 30, wherein the message received from the second device is a legacy modulation frame.

35. An article of manufacture including a non-transitory computer-readable medium having instructions stored thereon that, if executed by a access point, cause the access point to perform operations comprising:

transmitting a first frame comprising a duration field with a value to a first device via a shared-communications channel in a wireless local area network in accordance with a first modulation scheme, wherein the first device is an enhanced station and is configured to communicate in accordance with the first modulation scheme and a second modulation scheme; and receiving a second frame from a second device via the shared-communications channel in accordance with the second modulation scheme during a time interval defined by the value, wherein the second device is a legacy station and is configured to communicate in accordance with the second modulation scheme, wherein the first frame is undetectable to the second device, and wherein the first modulation scheme and the second modulation scheme are different from each other.

36. The article of manufacture of claim 35:

wherein the first modulation scheme is based at least in part on Orthogonal Frequency Division Multiplexing modulation; and wherein the second modulation scheme is based at least in part on one of Barker modulation and Complementary Code Keying modulation.

37. The article of manufacture of claim 35, wherein the transmitting is one of (i) periodic and (ii) sporadic.

38. The article of manufacture of claim 35, wherein the first frame further comprises instructions to refrain from transmitting frames for a time interval.

* * * * *